Patented June 22, 1926.

1,589,650

UNITED STATES PATENT OFFICE.

EDWIN C. E. LORD, OF WASHINGTON, DISTRICT OF COLUMBIA, DEDICATED TO THE GOVERNMENT AND THE PEOPLE OF THE UNITED STATES OF AMERICA.

COMPOUND FOR WATERPROOFING PORTLAND-CEMENT CONCRETE.

No Drawing.  Application filed December 14, 1925. Serial No. 75,476.

(GRANTED UNDER THE ACT OF MARCH 3, 1883; 22 STAT. L. 625.)

This application is made under the act of March 3, 1883, chapter 143 (22 Stat. 625) and the invention herein described and claimed may be used by the Government of the United States or any of its officers or employees in the prosecution of work for the Government, or by any citizen of the United States, without payment to me of any royalty thereon.

My process is based on the water repellent properties of colophony, or similar compounds containing abietic acid, and paraffin, when brought in contact with the constituents of Portland cement concrete.

The process consists in applying a solution of colophony and paraffin to the surfaces of concrete structures in such a manner that abietic acid will enter into chemical bond with the constituents of the cement, especially lime, causing new compounds to form, in conjunction with paraffin, that prevent the ingress of water or other liquids.

In order to attain this desired effect I first dissolve pure colophony containing as much as 80 per cent abietic acid in kerosene in about the proportion of two parts by weight of acid to three parts kerosene. I then dissolve in this solution sufficient refined paraffin to equal approximately two per cent by weight of paraffin. I then apply this solution to the thoroughly dry surface of the concrete, two applications being as a rule sufficient to thoroughly prevent the ingress of water or other liquids.

I claim:

A compound for waterproofing concrete, consisting of a solution of colophony containing 80% abietic acid and kerosene in the proportion of two parts by weight of acid to three parts of kerosene, and paraffin in an amount sufficient to equal approximately 2% by weight.

EDWIN C. E. LORD.